United States Patent [19]

Arnold

[11] Patent Number: 5,802,889
[45] Date of Patent: Sep. 8, 1998

[54] RAPID SECURING BICYCLE LOCK

[76] Inventor: L. Taylor Arnold, 13500 Lipizzan Ct., Matthews, N.C. 28105

[21] Appl. No.: 834,935

[22] Filed: Apr. 7, 1997

[51] Int. Cl.$^6$ .................................................. E05B 71/00
[52] U.S. Cl. ..................... 70/18; 70/40; 70/62; 70/233; 70/234; 211/5
[58] Field of Search ............... 70/17, 48, 233–236, 70/36, 37, 62, 227, 228, 14–16, 18, 19, 40; 211/4, 5, 8

[56] References Cited

U.S. PATENT DOCUMENTS

| | | | |
|---|---|---|---|
| 440,949 | 11/1890 | Fuller | 70/228 |
| 533,755 | 2/1895 | Taylor | 70/227 |
| 572,798 | 12/1896 | Hellwig | 70/228 |
| 607,545 | 7/1898 | Martin | 70/235 |
| 611,401 | 9/1898 | White | 70/234 |
| 621,072 | 3/1899 | Gregory | 211/5 |
| 634,441 | 10/1899 | Capen et al. | 70/234 |
| 661,677 | 11/1900 | Taylor | 70/234 |
| 691,941 | 1/1902 | Headson | 70/17 |
| 863,298 | 8/1907 | Malcolm | 70/17 |
| 1,153,405 | 9/1915 | Rogers | 70/48 |
| 1,197,549 | 9/1916 | Russell | 70/17 |
| 3,844,146 | 10/1974 | Fouces et al. | 70/227 |
| 4,033,160 | 7/1977 | Mima | 70/233 |
| 4,269,049 | 5/1981 | Henderson | 70/227 |
| 4,519,226 | 5/1985 | Hadaway | 70/48 |
| 4,708,004 | 11/1987 | Allen | 70/226 |
| 5,197,310 | 3/1993 | Pedersen | 70/227 |
| 5,444,999 | 8/1995 | Hsiao | 70/48 X |

FOREIGN PATENT DOCUMENTS

| | | | |
|---|---|---|---|
| 0 443 217 A1 | 8/1991 | European Pat. Off. | |
| 821190 | 11/1937 | France | 70/227 |
| 829746 | 7/1938 | France | 70/17 |
| 193650 | 12/1907 | Germany | |
| 195484 | 2/1908 | Germany | 70/18 |
| 248229 | 6/1912 | Germany | 70/17 |
| 539918 | 12/1931 | Germany | 70/233 |
| 743543 | 12/1943 | Germany | 70/233 |
| 803 697 | 4/1951 | Germany | |
| 600584 | 12/1959 | Italy | 70/227 |
| 53042 | 9/1933 | Norway | 70/17 |
| 46316 | 12/1919 | Sweden | 70/17 |
| 73264 | 12/1930 | Sweden | |
| 94391 | 5/1922 | Switzerland | 70/62 |
| 185019 | 9/1936 | Switzerland | 70/234 |
| 22220 | 11/1899 | United Kingdom | 70/17 |
| 10309 | 5/1912 | United Kingdom | 70/48 |
| 275666 | 11/1927 | United Kingdom | 70/17 |
| 685346 | 12/1952 | United Kingdom | 70/227 |

*Primary Examiner*—Lloyd A. Gall
*Attorney, Agent, or Firm*—Bell Seltzer Intellectual Property Law Group of Alston & Bird, LLP

[57] ABSTRACT

An improved bicycle locking mechanism, mounted on a bicycle, which minimizes manual manipulation and operation time. Mechanism consists of two main sections, a tubular connector(38) and a crescent-shaped housing(50). Mechanism is activated by a plunger(26), the vertical motion of which is translated to circular motion of a shackle (22) by a series of gears. The gear series rotates the shackle (22) into a locked position. A key frees the shackle(22) and a spring(28) resets the locking system. Mechanism stores safely within the frame of a bicycle. A spring hinge allows lock to be positioned for rapid activation and rapid storage.

19 Claims, 5 Drawing Sheets fig. 3-A
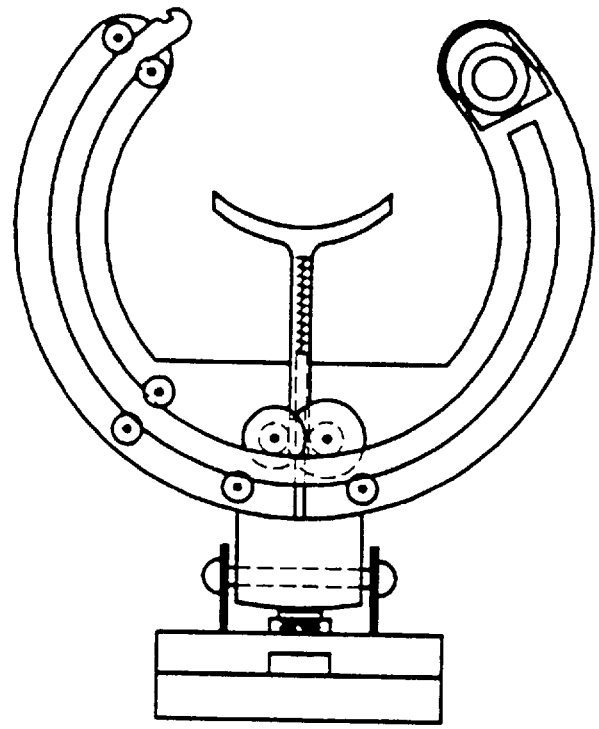
fig. 3-B
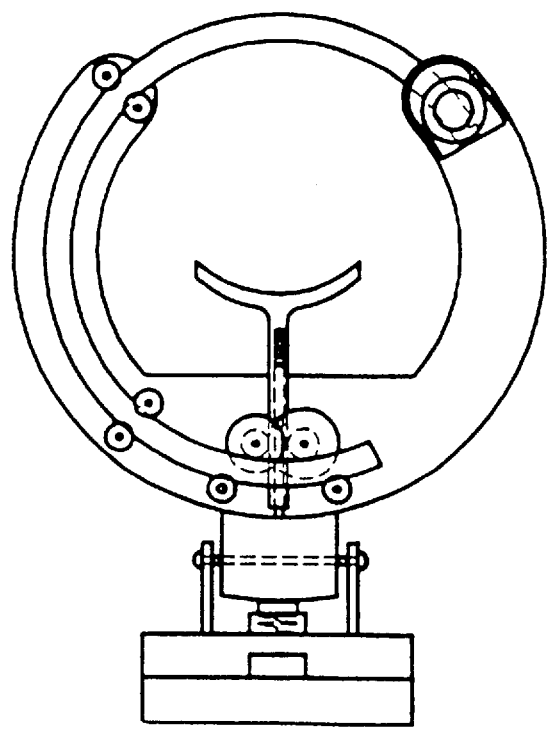

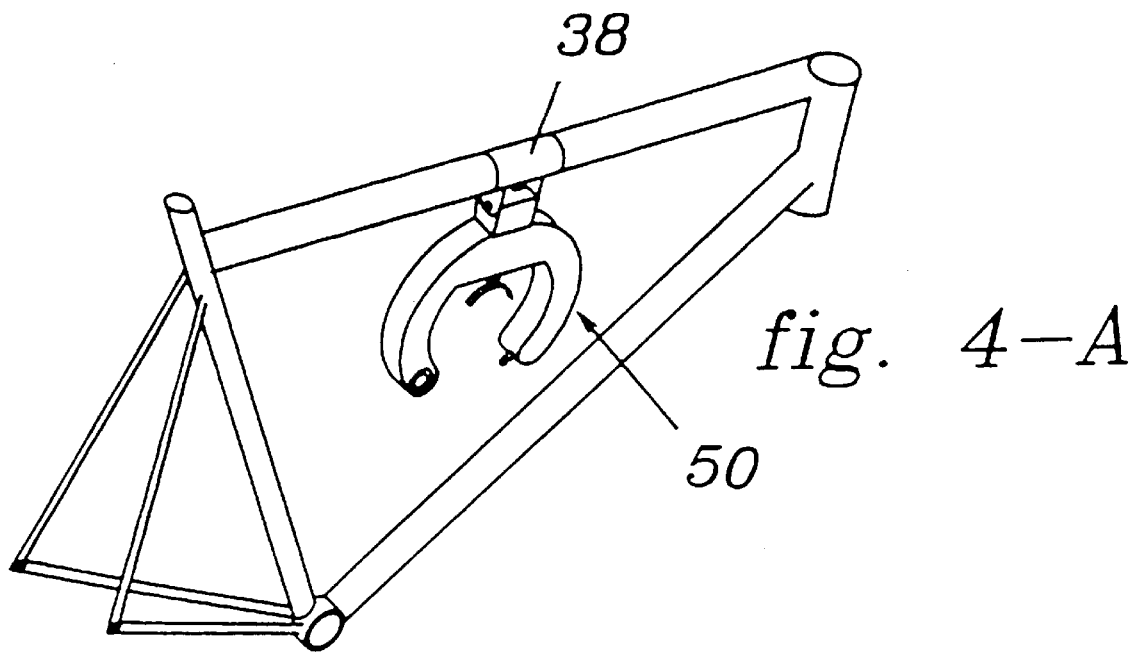
fig. 4-A
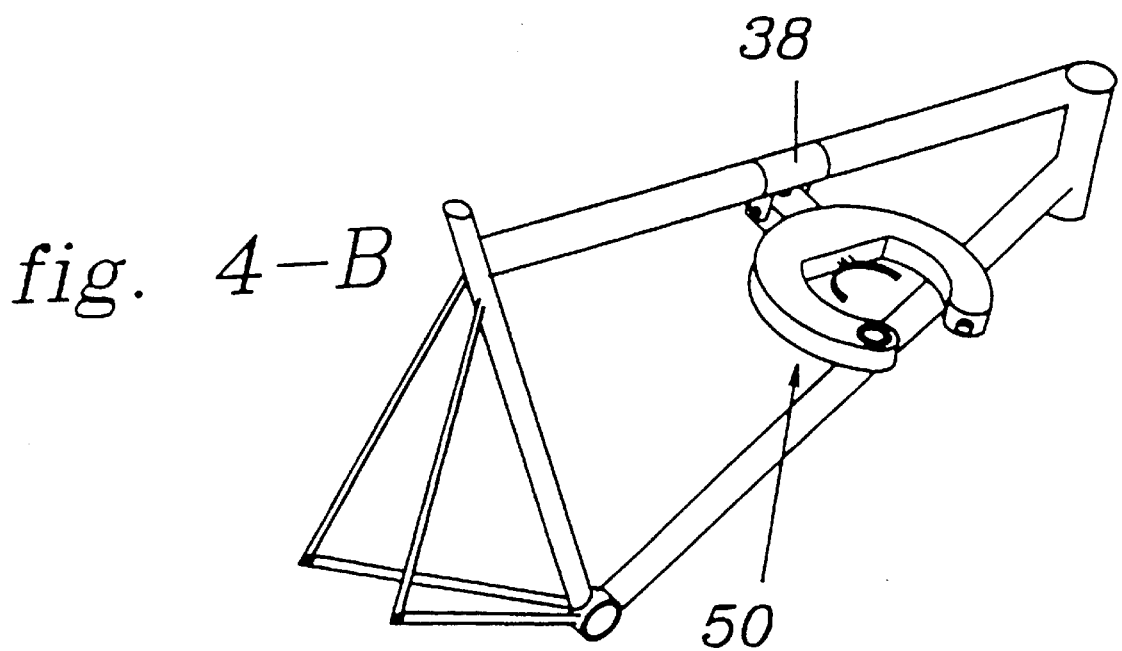
fig. 4-B

RAPID SECURING BICYCLE LOCK

BACKGROUND

1. Field of Invention

This invention relates to bicycles, specifically to securing bicycles against theft.

2. Description of Prior Art

Bicycles provide rapid, inexpensive, and reliable transportation due to their efficient design and ease of portability. Such portability and value make bicycles prime targets for thieves.

To prevent bicycle theft, inventors have designed various types of bicycle locks. Some of these locks employ various techniques to temporarily bind bicycles to more permanently positioned objects. Others attempt simply to render the bicycle inoperable, if not immobile. Two locks which fall into the first category and are in popular use are the "U-shaped" lock and the "Cable and padlock" lock. Both locks are difficult to carry, clumsy to handle, and time-consuming to operate. For a bicycle lock to work as a theft deterrent, it must be with a bicycle. However, neither design has accounted for the lock's easy transport on a bicycle. "U-lock" designs are often sold with frame clamps which are designed as an afterthought and consequently often fail with repeated use. "U-locks" then must be carried by the rider, creating nuisance baggage at the very least, and at worst, a dangerous distraction to monitor. "Cable and padlock" devices are long and ungainly. They too have to be carried by the rider, or wrapped around the bicycle frame in a manner which secures the device for travel, but which makes their removal from the bicycle difficult and time-consuming.

"U-shaped" locks and "Cable and padlock" devices are difficult and time-consuming to operate. Operating a "U-lock" requires handling of four parts: a U-shaped member, a cross-bar, a key, and the bicycle. It is difficult for any person to simultaneously steady and manipulate all four of these objects. Laboriously doing so takes valuable time from the rider. Operating a "Cable and padlock" device requires the rider to perform three separate manipulations. First, the rider must unlock and hold the padlock. Second, the rider must thread the cable around the bicycle and a post and through the lock shackle. Third, the rider must re-lock the padlock. Performing this sequence of tasks is time-consuming and awkward.

Both "U-shaped" and "Cable and padlock" devices, when employed, fall haphazardly upon the frame of the bicycle. In this situation, the lock damages the surfaces of the bicycle by denting the metal of the frame, or scratching the paint.

Several inventions which use various other encircling devices as theft prevention have been patented. Many of these aim solely to prevent rotation of one or other of the bicycle wheels. This is the case with U.S. Pat. No. 5,197,310 (1993) to Pedersen, U.S. Pat. No. 4,708,004 (1987) to Allen, U.S. Pat. No. 4,269,049 (1981) to Henderson, U.S. Pat. No. 3,844,146 (1974) to Fouces, et al., European patent 0 443 217 A1 (1990) to Gerhard, German patent 803,697 (1949) to Hinkelmann, and Swedish patent 73,264 (1930) to Heitmann. While all of these prevent a bicycle wheel from rotating, they do not actually fasten the bicycle down. The device in U.S. Pat. No. 4,033,160 (1977) to Mima attempts to solve this problem. This lock does fasten a wheel and fasten a bicycle, but uses an easily cut cable to lock a bicycle to a post. This cable must be manipulated by hand.

Other encircling devices are intended to be mounted on a wall, to which the rider places his/her bicycle. This sort of device is intended for public use, and is documented in U.S. Pat. No. 634,441 (1899) to Capen, et al., U.S. Pat. No. 621,072 (1899) to Gregory, U.S. Pat. No. 611,401 (1898) to White, U.S. Pat. No. 607,545 (1898) to Martin, and German patent 193,650 (1906) to Nielson. These devices are impractical for a rider, who cannot be assured that such a device will await at his/her destination. German patent 193,650 (1906) to Nielson and U.S. Pat. No. 621,072 (1899) to Gregory use plungers to activate encircling pincers to secure a bicycle. These pincers greatly enlarge the size of these locks, making the locks bulky and unwieldy.

OBJECTS AND ADVANTAGES

Accordingly, several objects and advantages of the present invention are:

a) to provide a locking mechanism which can secure a bicycle rapidly;

b) to provide a locking mechanism which can be operated with minimal manual manipulation;

c) to provide a locking mechanism which stays attached to the bicycle at all times;

d) to provide a locking mechanism which stores neatly within the plane of the bicycle frame;

e) to provide a locking mechanism which can be regarded as an integral part of a bicycle;

f) to provide a locking mechanism which can be regarded as an integral part of a bicycle's inherent security.

Additional objects and advantages will become apparent upon thorough reading of the following description and drawings.

DRAWING FIGURES

In the drawings, related drawings are labeled with identical number prefixes, but with different alphabetic suffixes.

FIGS. 3-A and 3-B show the encircling portion of the invention in operation.

FIGS. 4-A and 4-B show the invention at different times during its operation in a possible position in a bicycle frame.

Figure 5:
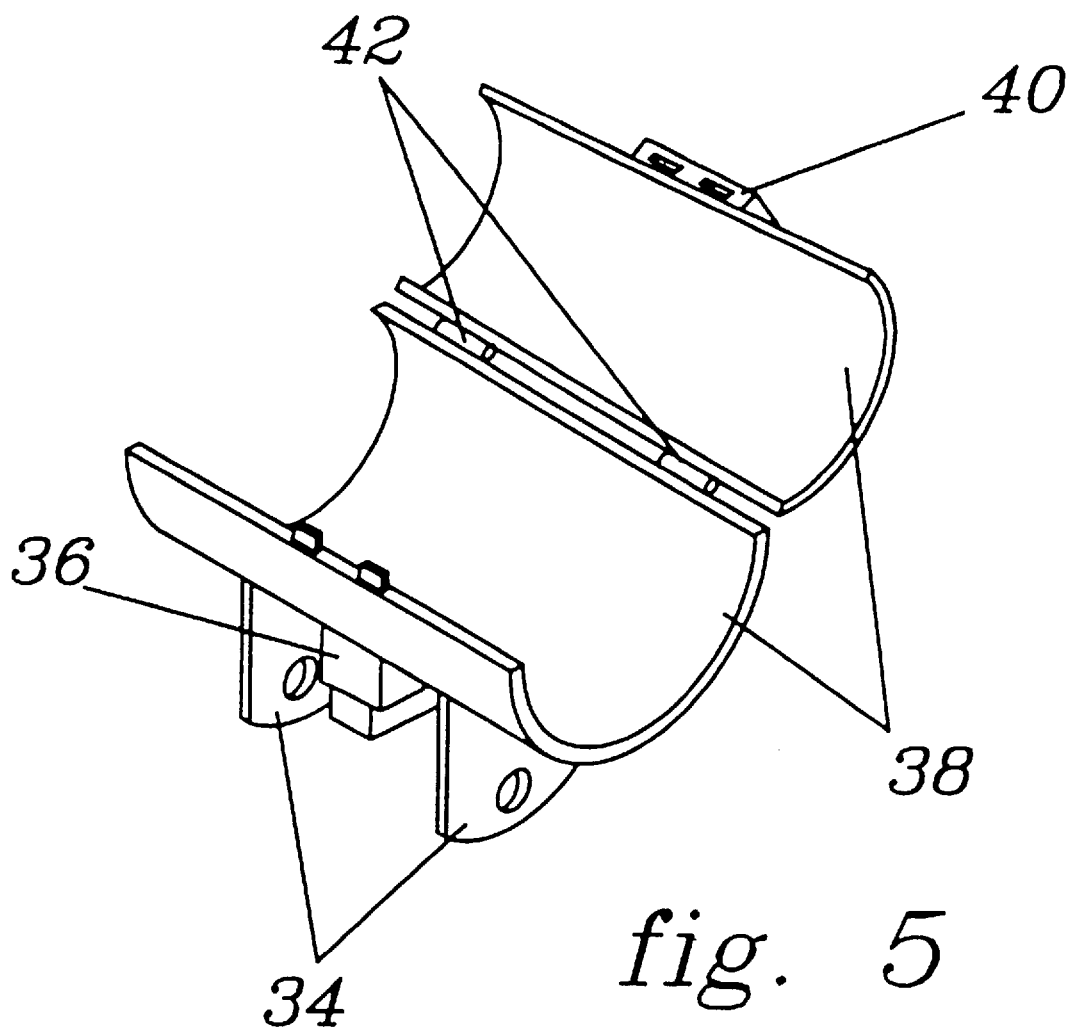

FIG. 5 shows the invention's tubular connector.

REFERENCE NUMERALS IN DRAWINGS

| | |
|---|---|
| 10. Front Housing | 12. Gear D |
| 14. Pinion C | 16. Gear B |
| 18. Pinion A | 20. Guide Wheels |
| 22. Shackle | 24. Primary Lock |
| 26. Plunger | 28. Plunger Spring |
| 30. Guide Post | 32. Rear Housing |
| 34. Hinge Arms | 36. Hinge Spring |
| 38. Tubular Connector | 40. Secondary Lock |
| 42. Tube Hinges | 44. Spring Hinge Axle |
| 46. Plunger Rack | 48. Shackle Teeth |
| 50. Crescent | |

Description - FIGS. 1 to 5

Figure 1:
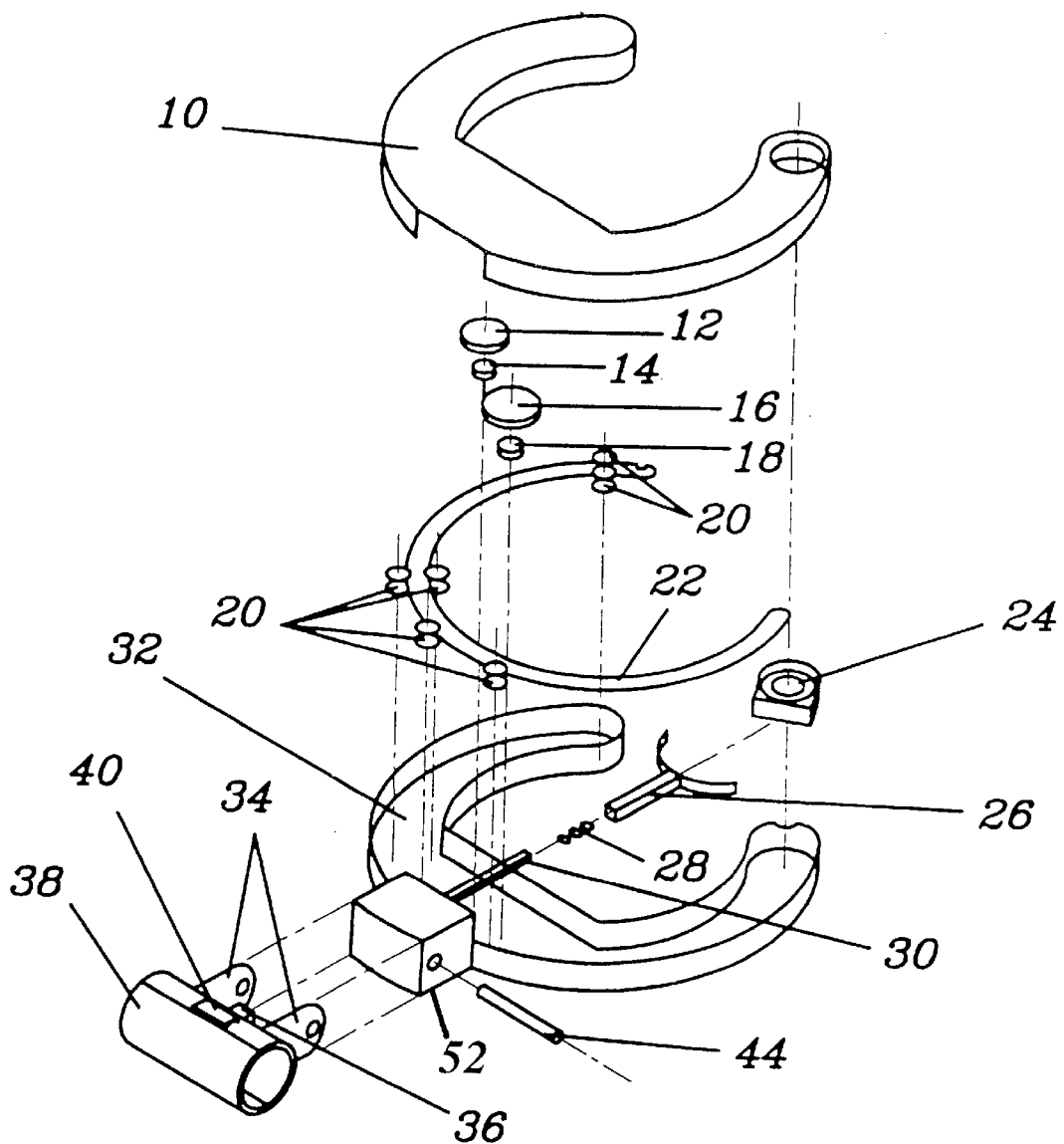
FIG. 1 shows an exploded view of the entire invention.

FIG. 1 shows an exploded view of the invention in its entirety. The preferred embodiment is constructed of strong, lightweight bicycle metals. A Front Housing(10) is connected by welding or riveting to a Rear Housing(32). The housings can be stamped from rolled bicycle metal. These two parts create a strong shell which comprises the main body of the lock. The shell is roughly crescent shaped and roughly 17 cm in diameter. From now on, this portion will be referred to as Crescent(50). At one end of Crescent(50) is a roughly rectangular shaped block (52) which connects to Hinge Arms(34). At the opposing end Crescent(50) has an opening of about 9 cm. In the center of the ends of the Crescent(50) arms there is a circular hole about 1 cm in diameter through which a circular Shackle(22) is threaded.

Enclosed within Crescent(50) created by Front Housing (10) and Rear Housing(32) is Shackle(22). Shackle(22) is about 1 cm in diameter and is supported in the center of Front Housing(10) and Rear Housing(32) by Guide Wheels (20). There are 6 Guide Wheels(20) which are hourglass shaped. These Guide Wheels(20) rotate on axles attached to Front Housing(10) and Rear Housing(32). Guide Wheels (20) keep Shackle(22) revolving in a plane parallel to Front Housing(10) and Rear Housing(32). Guide Wheels(20) are positioned such that they guide Shackle(22) through the holes in the crescent arms of Front Housing(10) and Rear Housing(32) and guide Shackle Teeth(48) against a Gear D(12).

Gear D(12) is a 24 tooth spur gear which meshes with Shackle Teeth(48). Gear D(12) is secured to an axle which it shares and rotates in unison with a Pinion C(14). Pinion C(14) is a 9 tooth spur gear which meshes with a Gear B(16). Gear B(16) is a 48 tooth spur gear which is attached to an axle which it shares and rotates in unison with a Pinion A(18). Pinion A(18) is a 12 tooth spur gear which meshes with a Plunger Rack(46).

Plunger Rack(46) is molded into a Plunger(26). Plunger Rack(46) extends about 2.5 cm up Plunger(26). Plunger(26) extends through the housing shell by about 3 cm toward the center of Crescent(50). Plunger(26) is roughly T-shaped and hollow in its vertical member. Inside the vertical member is a Plunger Spring(28) which is compressed between the horizontal member of Plunger(26) and a Guide Post(30). Guide Post(30) protrudes from the roughly rectangular portion of Rear Housing(32).

When Shackle(22) is rotated via Gear D(12) upon Guide Wheels(20) it bridges the crescent created by Rear Housing (32) and Front Housing(10) and enters the Primary Lock (24). Primary Lock(24) is a key operated lock which binds Shackle(22) automatically when Shackle(22) breaches the plane of the lock's latch bolt.

The entire Crescent(50) created by Front Housing(10) and Rear Housing(32) rotates on a Spring Hinge Axle(44). Spring Hinge Axle(44) connects Rear Housing(32) to Hinge Arms(34). Hinge Arms(34) are permanently attached to a Tubular Connector(38). Between Hinge Arms(34) and attached to Tubular Connector(38) is a Hinge Spring(36) which applies constant pressure between Tubular Connector (38) and Rear Housing(32), regardless of the rotation of Crescent(50).

Tubular Connector(38) is about 2.5 cm in diameter and is divided in half lengthwise. Bridging one of these separations are Tube Hinges(42). The other separation is bridged with a Secondary Lock(40) which can be locked and unlocked to allow for placement of Tubular Connector(38) around a bicycle frame.

Figure 2:
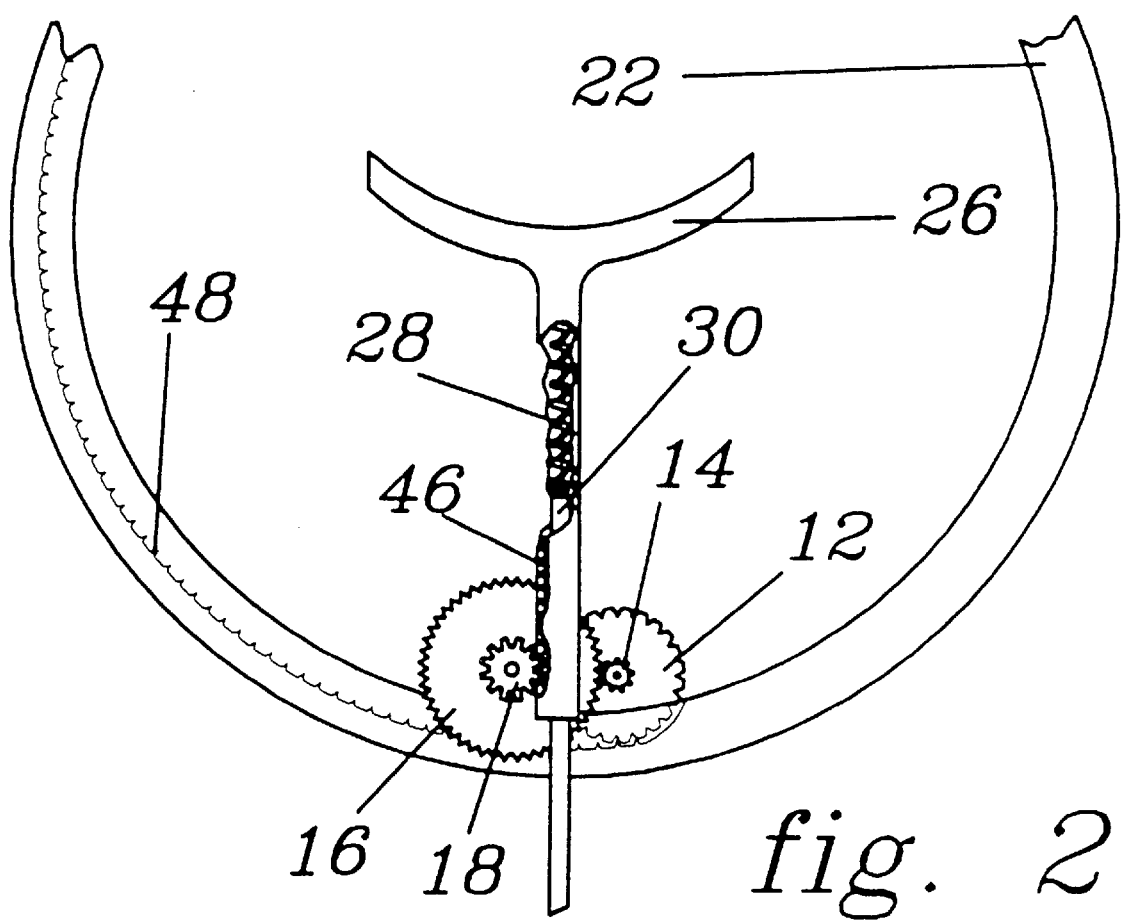
FIG. 2 shows a close-up view of the invention's gear mechanism, seen from the rear of the invention.

FIG. 2 shows the placement of Plunger(26), Plunger Rack(46), Shackle(22), Gear D(12), Pinion C(14), Gear B(16), Pinion A(18), Plunger Spring(28), and Guide Post (30) from the vantage point of Rear Housing(32). Plunger (26) compresses Plunger Spring(28) against Guide Post(30). Plunger Rack(46) meshes with Pinion A(18). Pinion A(18) rotates Gear B(16). Gear B(16) rotates Pinion C(14). Pinion C(14) rotates Gear D(12). Gear D(12) meshes with Shackle Teeth(48) and thereby rotates Shackle(22). (In FIG. 2, a closing motion of Shackle(22) is made by rotating counter-clockwise, and an opening motion is made by rotating clockwise.)

FIG. 3-A shows the invention from the vantage of Front Housing(10), but for clarity, Front Housing(10) is removed. Shackle(22) is shown in its open position and Plunger(26) is shown in its corresponding extended position.

FIG. 3-B-shows the invention in the same fashion as does FIG. 3-A, but shows Shackle(22) in its closed position and Plunger(26) in its corresponding contracted position.

FIG. 4-A shows the invention mounted in a bicycle frame. The invention is maintained within the plane of a bicycle frame by Hinge Spring(36). Shackle(22) is in the open position.

FIG. 4-B shows the invention mounted in a bicycle frame. The invention has been rotated at Spring Hinge Axle(44) and is maintained at an angle perpendicular to the frame of the bicycle by Hinge Spring(36). Shackle(22) is in the open position.

FIG. 5 shows Tubular Connector(38) open to receive a bicycle frame. Tubular Connector(38) is approximately 10 cm in length. Its two halves swing open on Tube Hinges(42) and are secured closed by Secondary Lock(40). For clarity, Hinge Arms(34) are shown disconnected from Rear Housing (32).

From the description above, a number of advantages of my Rapid Securing Bicycle Lock become evident:

(a) The user of such a bicycle lock can secure a bicycle rapidly. This rapid securing is a boon to those concerned about the safety of their belongings as well as those concerned with saving time.

(b) The user of such a bicycle lock must perform minimal manual manipulation of the lock. This reduction of handling decreases operation time and increases ease of locking.

(c) This bicycle lock will stay attached to the owner's bicycle at all times, or until such time that the owner wishes to transfer the lock to another bicycle. Wherever the bicycle is, so there will be a convenient, secure lock.

(d) This bicycle lock stores neatly within the plane of the bicycle frame, out of the way of the bicycle's operation, but always available for rapid, easy use.

(e) This bicycle lock can be regarded as a part of a bicycle's inherent security, due to its relative permanence on the bicycle frame. The fact that this mechanism is solid, reliable, and near will increase the owner's confidence in his/her bicycle's safety, and thus offer him/her peace of mind.

(f) This mechanism cannot be easily lost or stolen due to its attachment to the owner's bicycle.

Operation - FIGS. 2, 3-A, 3-B, 4-A, 4-B, 5

The first step in using the Rapid Securing Bicycle Lock is to mount the mechanism on a bicycle frame. FIG. 5 shows Tubular Connector(38) disconnected, for graphical clarity, from the main part of the bicycle lock. Tubular Connector (38) encircles a portion of a bicycle frame. An example of the lock's location is given in FIGS. 4-A and 4-B. As can be seen in FIG. 5, the two halves of Tubular Connector(38) are connected on one side by Tube Hinges (42). The two halves are connected on the other side by Secondary Lock(40). The two halves rotate apart on Tube Hinges(42). Tubular Connector(38) is placed so as to encircle a portion of a bicycle frame. The two halves of Tubular Connector(38) are brought together, locking together via Secondary Lock(40).

For the following description, it shall be assumed that the lock has been mounted onto a bicycle as seen in FIG. 4-A. When the lock is in this position, that is, parallel to the plane of a bicycle, Hinge Spring(36) maintains the lock's position solidly.

To use the Rapid Securing Bicycle Lock a rider must locate a solid object to which he/she can fasten a bicycle. The ideal object is a vertical pole of no more than 10 cm diameter. Practically, however, the object may be much narrower and at any angle from the vertical.

The rider grasps Crescent(50) and pulls it up, rotating it on Spring Hinge Axle(44) until Crescent(50) is ninety degrees from its original position. Hinge Spring(36), having maintained a constant force on Crescent(50), now holds Crescent(50) in the ninety-degree position. Crescent(50) is now perpendicular to the frame of the bicycle, as shown in FIG. 4-B. Tubular Connector(38), with corresponding Hinge Arms(34) has remained in the original parallel configuration.

Because the bicycle lock is attached to the bicycle, the lock and bicycle act as one mechanism. The lock is now open, as in FIG. 3-A. The rider now may pick up the bicycle and lock as one unit and thrust Crescent(50) around a chosen securing post. See FIG. 2. In a fraction of a second, Plunger(26) is depressed. Plunger Rack(46) meshes with the teeth of Pinion A(18). Pinion A(18) turns Gear B(16). Gear B(16) turns Pinion C(14). Pinion C(14) turns Gear D(12). Gear D(12) meshes with Shackle Teeth(48) and thereby turns Shackle(22). Shackle(22) crosses the gap in Crescent (50) and thereby encircles a securing post. Shackle(22) enters the Primary Lock(24) and is thereby held into place. Shackle(22) is now closed, as in FIG. 3-B. The rider may leave his/her bicycle, certain of its security.

Unlocking a bicycle is a matter of ease. The rider opens the tumblers of Primary Lock(24) with a key. Plunger Spring(28) (FIG. 2), which had been compressed by the original securing of the bicycle, pushes out on Plunger(26), thereby reversing the string of gear interactions described above. This reversal of gear interactions withdraws Shackle (22) to within Crescent(50).

At this point the main body of the lock is perpendicular to the plane of the bicycle frame due to the holding action of Hinge Spring(36). The setup looks very much like FIG. 4-B. To reposition the main lock body, the rider need only push down on Crescent(50). In so doing, the rider causes Crescent (50) to rotate on Spring Hinge Axle(44). Thus, Crescent(50) returns to its initial configuration in the plane of the bicycle frame. The rider may now mount and ride the bicycle.

SUMMARY, RAMIFICATIONS, AND SCOPE

Accordingly, the reader will see that the Rapid Securing Bicycle Lock is a reliable, effective, and easy to use mechanism for securing a bicycle and thus providing peace of mind to the owner of a bicycle. It accomplishes these things by:
  being able to be used by a person of any age;
  being able to be used rapidly;
  requiring little manual manipulation;
  remaining attached to a bicycle, and thereby readily available at all times;
  remaining out of the way of a bicycle's operation until the mechanism is needed;
  in effect becoming a part of the bicycle;
  becoming a "security system for the bicycle";
  being light and streamlined and thus not a detriment to a bicycle's performance.

The specificities contained in the above description should not be understood to limit the scope of this invention, but instead should be interpreted as being indicative of the preferred embodiment of the invention. For example, the Hinge Arms and Hinge Spring could be permanently attached directly to the frame of the bicycle, eliminating the Tubular Connector altogether. The Front and Rear Housings need not form a smooth crescent, but may be more squarely C-shaped. The entire mechanism may be made out of materials other than bicycle metals. Composite materials, for example, hold great promise as construction materials for such a mechanism. The size of the entire mechanism may vary based on the size of the available space in a bicycle frame and the size of available locking posts. Primary and Secondary Locks may be either key or combination locks.

Thus the scope of the invention should be determined by the legal equivalents of the following claims, rather than by the examples given.

I claim:

1. A bicycle locking device for locking a bicycle to a fixed object, said device comprising:
   a housing defining a central opening and being adapted for securement to the bicycle, said housing further defining an entrance into the central opening through which the fixed object can be passed such that the fixed object is partially encircled by the housing;
   a plunger supported by said housing such that a portion of said plunger is within said central opening and spaced from said entrance, said plunger being adapted for engagement and movement by the fixed object;
   a shackle operatively connected to said plunger for orbital movement in response to movement of the plunger, said shackle being supported by said housing for circular movement about an axis of rotation which does not pass through the shackle such that the shackle orbits around the fixed object and bridges the entrance to the central opening defined by said housing; and
   a lock supported by the housing for locking the shackle once the fixed object has been fully encircled such that the fixed object cannot be removed from the central opening through the entrance therein.

2. A bicycle locking device as defined in claim 1 further comprising a connector adapted for surrounding at least a portion of the frame of the bicycle.

3. A bicycle locking device as defined in claim 2 wherein said connector further comprises a hinge for rotatably supporting said housing.

4. A bicycle locking device as defined in claim 3 wherein said hinge is a spring loaded hinge for maintaining said housing in at least one rotational position relative to said connector.

5. A bicycle locking device as defined in claim 1 wherein said plunger further comprises an arcuate engagement surface against which the fixed object is engaged.

6. A bicycle locking device as defined in claim 1 wherein said lock comprises a combination lock.

7. A bicycle locking device as defined in claim 1 wherein said lock comprises a keyed lock.

8. A bicycle locking device as defined in claim 1 wherein said housing is made of metal.

9. A bicycle locking device for locking a bicycle to a fixed object, said device comprising:
   a housing defining a central opening and being adapted for securement to the bicycle, said housing further defining an entrance into the central opening through which the fixed object can be passed such that the fixed object is partially encircled by the housing;

a plunger supported by said housing such that a portion of said plunger is within said central opening and spaced from said entrance, said plunger being adapted for engagement and linear movement by the fixed object, said plunger further having a rack gear along at least one side thereof;

at least one pinion gear rotatably supported by said housing and being rotationally movable in response to linear movement of the rack gear;

a shackle having gear teeth engaged with said pinion gear such that the shackle is moved in response to movement of the plunger, said shackle being supported by said housing for circular movement about an axis of rotation which does not pass through the shackle such that the shackle orbits around the fixed object and bridges the entrance to the central opening defined by said housing; and a lock supported by the housing for locking the shackle once the fixed object has been fully encircled such that the fixed object cannot be removed from the central opening through the entrance therein.

10. A bicycle locking device as defined in claim 9 wherein said pinion gear further comprises a first row of gear teeth of a predetermined number and a parallel second row of gear teeth of predetermined number less than the first row, said first row being in meshing engagement with said shackle gear teeth.

11. A bicycle locking device as defined in claim 10 further comprising a second pinion gear rotatably supported by said housing and being in engagement with both the rack gear of said plunger and the first pinion gear.

12. A bicycle locking device as defined in claim 11 wherein said second pinion gear further comprises a first row of gear teeth of a predetermined number and a parallel second row of gear teeth of predetermined number less than the first row, said first row of gear teeth of said second pinion gear being in meshing engagement with the gear teeth of said second row of said first pinion gear, and said second row of gear teeth of said second gear being in meshing engagement with said rack gear.

13. A bicycle locking device as defined in claim 9 further comprising a connector adapted for surrounding at least a portion of the frame of the bicycle.

14. A bicycle locking device as defined in claim 13 wherein said connector further comprises a hinge for rotatably supporting said housing.

15. A bicycle locking device as defined in claim 14 wherein said hinge is a spring loaded hinge for maintaining said housing in at least one rotational position relative to said connector.

16. A bicycle locking device as defined in claim 9 wherein said plunger further comprises an arcuate engagement surface against which the fixed object is engaged.

17. A bicycle locking device as defined in claim 9 wherein said lock comprises a combination lock.

18. A bicycle locking device as defined in claim 9 wherein said lock comprises a keyed lock.

19. A bicycle locking device as defined in claim 9 wherein said housing is made of metal.

* * * * *